(12) United States Patent
Burton, Sr.

(10) Patent No.: US 6,430,865 B1
(45) Date of Patent: Aug. 13, 2002

(54) OVAL FISHING LINE GUIDE

(76) Inventor: Calvin L. Burton, Sr., 249 Heberton Ave., Staten Island, NY (US) 10302

( * ) Notice: Subject to any disclaimer, the term of this patent is extended or adjusted under 35 U.S.C. 154(b) by 12 days.

(21) Appl. No.: 09/602,343

(22) Filed: Jun. 24, 2000

Related U.S. Application Data

(63) Continuation-in-part of application No. 09/426,276, filed on Oct. 25, 1999, now abandoned.

(51) Int. Cl.$^7$ ............................................... A01K 87/14
(52) U.S. Cl. ........................................ 43/24; 43/18.1 R
(58) Field of Search ...................... 43/24, 18.1, 18.1 R; D22/143

(56) References Cited

U.S. PATENT DOCUMENTS

| | | | | |
|---|---|---|---|---|
| 958,775 | A | * 5/1910 | Shakespeare, Jr. | 43/24 |
| 1,627,643 | A | * 5/1927 | Haberl | 43/24 |
| 2,146,964 | A | * 2/1939 | Legat | 43/24 |
| 2,282,618 | A | 5/1942 | Stewart | 43/18.1 R |
| 2,992,506 | A | * 7/1961 | Garbolino | 43/24 |
| 3,063,186 | A | * 11/1962 | Ward, IV | 43/24 |
| 3,400,481 | A | * 9/1968 | Christenson | 43/24 |
| 3,417,501 | A | 12/1968 | Fulop | 43/24 |
| 3,641,696 | A | * 2/1972 | Fleischer | 43/24 |
| 3,971,151 | A | * 7/1976 | Banner | 43/24 |
| 4,011,680 | A | * 3/1977 | Rienzo, Sr. | 43/24 |
| 4,060,924 | A | * 12/1977 | Cunningham | 43/24 |
| 4,238,900 | A | 12/1980 | Cunningham | 43/24 |
| 4,860,482 | A | * 8/1989 | Yamato | 43/24 |
| 5,802,759 | A | * 9/1998 | Ohmura | 43/24 |
| 6,016,621 | A | * 1/2000 | Maeda | 43/24 |

FOREIGN PATENT DOCUMENTS

| | | | |
|---|---|---|---|
| JP | 10-66486 B1 | * | 3/1998 |
| JP | 10-178978 B1 | * | 7/1998 |
| JP | 10-210892 B1 | * | 8/1998 |
| JP | 10-290649 B1 | * | 11/1998 |
| JP | 11-206279 B1 | * | 8/1999 |

* cited by examiner

*Primary Examiner*—Darren W. Ark
(74) *Attorney, Agent, or Firm*—Donald J. Ersler

(57) ABSTRACT

An oval fishing line guide includes a guide, guide holder, and at least one base. A guide area includes a substantially vertical slot which is preferably terminated on each end by a portion of an ellipse. The guide holder preferably retains the guide on the sides thereof. A bottom of the guide holder is attached to a top of the at least one base. A bottom of the at least one base is shaped to be received by an outside perimeter of the fishing rod. The at least one base is attached to the fishing rod with any suitable attachment method. The width of the guide area is varied for the type reel, position on the rod, and for type of water. A plurality of guides in ascending sizes are attached to the fishing rod. A second embodiment of an oval fishing line guide may be fabricated from a single stamped metal piece. A third embodiment of an oval fishing line guide utilizes an oval guide attached to a base. A fourth embodiment of an oval fishing line guide utilizes an oval guide attached to a guide holder. A fifth embodiment of an oval fishing line guide utilizes an oval guide attached to at least two curved legs.

8 Claims, 5 Drawing Sheets

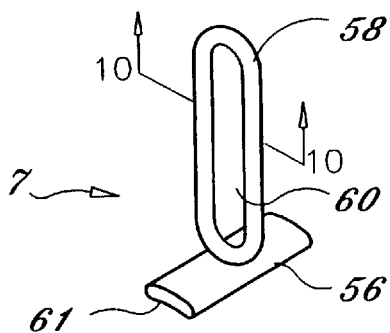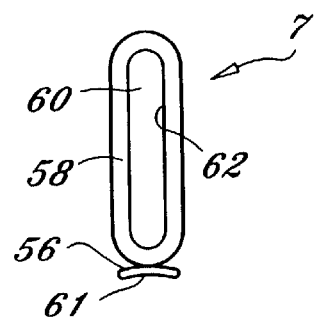
FIG. 7     FIG. 8
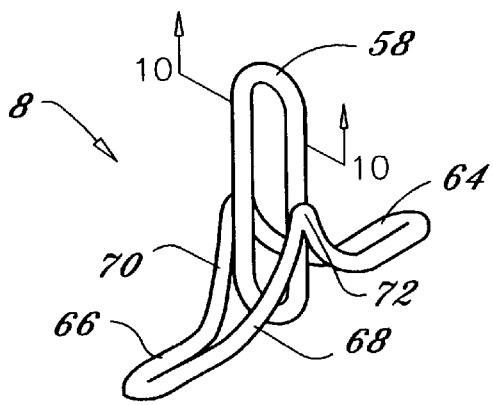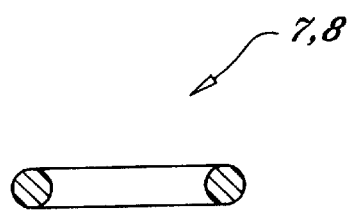
FIG. 9     FIG. 10
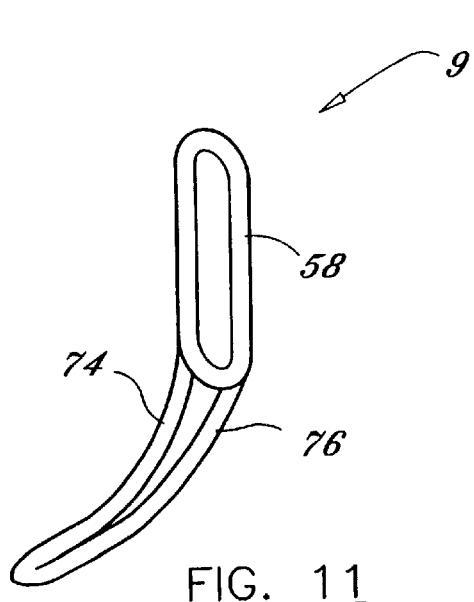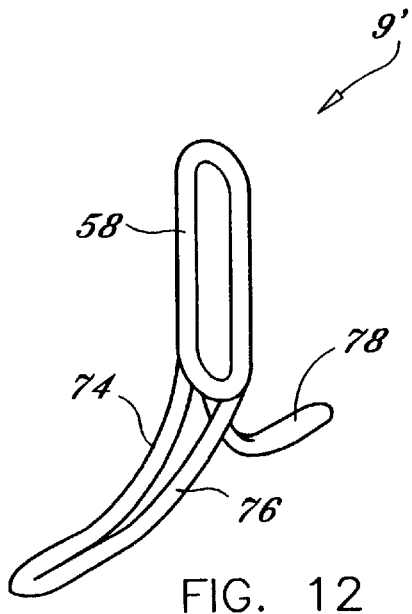
FIG. 11     FIG. 12

Prior Art

OVAL FISHING LINE GUIDE

CROSS-REFERENCES TO RELATED APPLICATIONS

This is a continuation-in-part application of Ser. No. 09/426,276 filed on Oct. 25, 1999 now abandoned.

BACKGROUND OF THE INVENTION

1. Field of the Invention

The present invention relates generally to fishing tackle and more specifically to a set of oval fishing line guides that are mounted to a fishing rod and which decrease the frictional effects due to entanglement from a coiled fishing line.

2. Discussion of the Prior Art

A problem frequently encountered with round opening fishing line guides is the problem of tangling that occurs from a fishing line being uncoiled off a reel. The tangled fishing line will provide resistance to the travel of the fishing line through the fishing line guides. Weeds, vegetation, and other water debris will often cling to the fishing line and not be knocked off by going through the fishing line guides. The water debris which remains on the fishing line will later provide added resistance to the fishing line during casting.

Accordingly, there is a clearly felt need in the art for an oval fishing line guide which reduces the coiled effect that a fishing line has coming off a reel and which decreases the amount of water debris which clings to a fishing line.

SUMMARY OF THE INVENTION

The primary objective of the present invention is to provide an oval fishing line guide which reduces the coiled effect that a fishing line has coming off a reel and which decreases the amount of water debris which clings to a fishing line.

According to the present invention, an oval fishing line guide includes a guide, guide holder, and at least one base. A guide area includes a substantially vertical slot which is preferably terminated on each end by a portion of an ellipse. The guide holder preferably retains the fishing line guide on the sides thereof. A bottom of the guide holder is attached to a top of the at least one base. A bottom of each base is shaped to be received by an outside perimeter of a fishing rod. Each base is attached to the outside perimeter of the fishing rod with any suitable attachment method. The width of the guide area is varied for the type reel, position on the rod, and the type of water (fresh or salt water). A plurality of fishing line guides in ascending sizes are attached to the fishing rod. A second embodiment of an oval fishing line guide may be fabricated from a single metal stamping.

A third embodiment of an oval fishing line guide utilizes an oval guide attached to a base. A fourth embodiment of an oval fishing line guide utilizes an oval guide attached to a guide holder. A fifth embodiment of an oval fishing line guide utilizes an oval guide attached to at least two curved legs.

Accordingly, it is an object of the present invention to provide an oval fishing line guide which decreases the amount of friction between the guide and the fishing line.

It is a further object of the present invention to provide an oval fishing line guide which reduces the amount of entanglement due to natural coiling in a fishing line.

It is yet a further object of the present invention to provide a set of oval fishing line guides which provide a more linear path for a fishing line to travel through than that of the prior art.

Finally, it is another object of the present invention to provide an oval fishing line guide which decreases the amount of water debris which clings to the fishing line.

These and additional objects, advantages, features and benefits of the present invention will become apparent from the following specification.

BRIEF DESCRIPTION OF THE DRAWINGS

FIG. 7 is a perspective view of a third embodiment of an oval fishing line guide in accordance with the present invention.

FIG. 8 is a front view of a third embodiment of an oval fishing line guide in accordance with the present invention.

FIG. 9 is a perspective view of a fourth embodiment of an oval fishing line guide in accordance with the present invention.

FIG. 10 is an enlarged cross-sectional view of an oval guide in accordance with the present invention.

FIG. 11 is a perspective view of a fifth embodiment of an oval fishing line guide in accordance with the present invention.

FIG. 12 is a perspective view of a fifth embodiment of an oval fishing line guide with a third leg in accordance with the present invention.

DETAILED DESCRIPTION OF THE PREFERRED EMBODIMENTS

Figure 1:
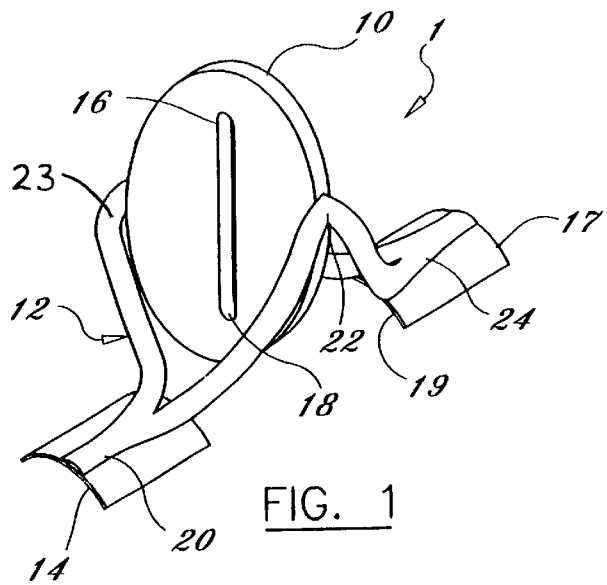
FIG. 1 is a perspective view of an oval fishing line guide in accordance with the present invention.
Figure 2:
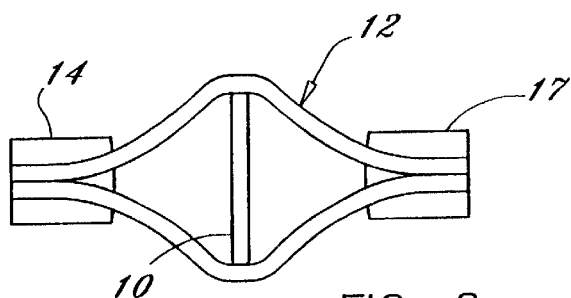
FIG. 2 is a top view of an oval fishing line guide in accordance with the present invention.
Figure 2A:
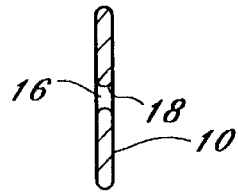
FIG. 2a is an enlarged cross-sectional view of the guide area in accordance with the present invention.
Figure 3:
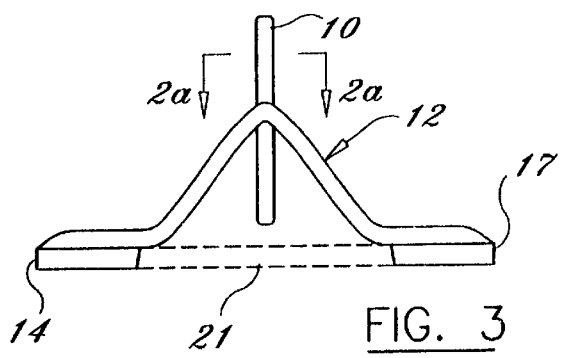
FIG. 3 is a side view of an oval fishing line guide in accordance with the present invention.
Figure 3A:
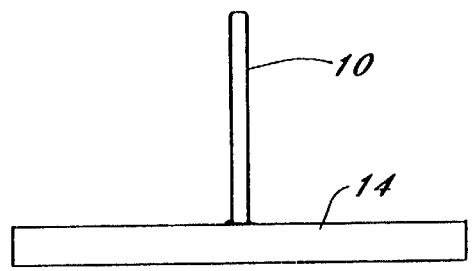
FIG. 3a is a side view of an oval fishing line guide without a guide holder in accordance with the present invention.
Figure 4:
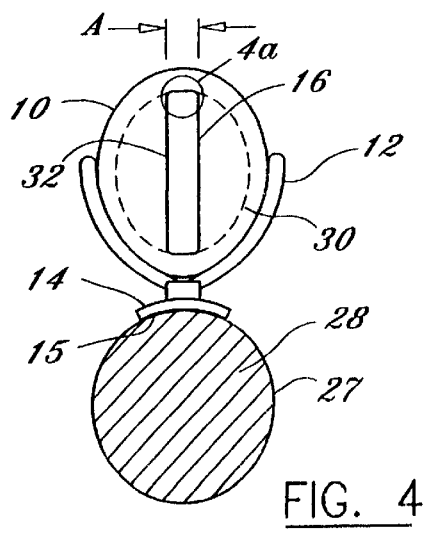
FIG. 4 is a front view of an oval fishing line guide in accordance with the present invention.

With reference now to the drawings, and particularly to FIG. 1, there is shown a perspective view of an oval fishing line guide 1. With reference to FIGS. 2–4, the oval fishing line guide includes a guide 10, guide holder 12, and at least one base 14. A guide area 16 is formed through the guide 10. The guide area 16 includes a substantially vertical slot which is preferably terminated on each end by a portion of a theoretical ellipse 30. With reference to FIG. 2a, a cross section of the guide area 16 reveals that an inside perimeter 18 is preferably rounded to reduce friction and wear to a fishing line. The inside perimeter 18 of the guide area 16 is preferably coated with graphite to reduce the amount of friction between a fishing line and the inside perimeter 18.

The guide holder 12 preferably retains the guide 10 on the sides thereof. The oval guide 10 is preferably retained in a substantially vertical orientation. The guide holder 12 preferably includes a first leg 20, a second leg 24, and a first upright portion 22, and a second upright portion 23. The first and second upright portions extend upward from the first and second legs, respectively. The guide 10 may be attached to the guide holder 12 with adhesive, brazing, or any suitable attachment method or substance. The guide 10 and the guide holder 12 could also be fabricated from a single piece of material by die casting, or any other suitable manufacturing process.

A bottom of the first leg 20 is attached to a top of the first base 14 and a bottom of the second leg 24 is attached to a top of a second base 17 with adhesive, brazing, or any suitable attachment method or substance. A bottom surface 15 of the first base 14 and a bottom surface 19 of the second base 17 are shaped to be received by an outside perimeter 27 of a fishing rod 28. The bottom surface 15 is shown round, but could be any other shape to accommodate the outside perimeter 27 of the fishing rod 28. The first and second bases are attached to the fishing rod 28 with any suitable attachment method. The use of the first and second bases are preferred, but a single base may be used as suggested by the dotted lines 21 in FIG. 3. The guide 10 and one of the bases could be fabricated as a single piece with any suitable manufacturing process thus eliminating the guide holder 12. The guide 10, guide holder 12, the first base 14, and the second base 17 could also be fabricated as a single piece with any suitable manufacturing process.

Figure 6:
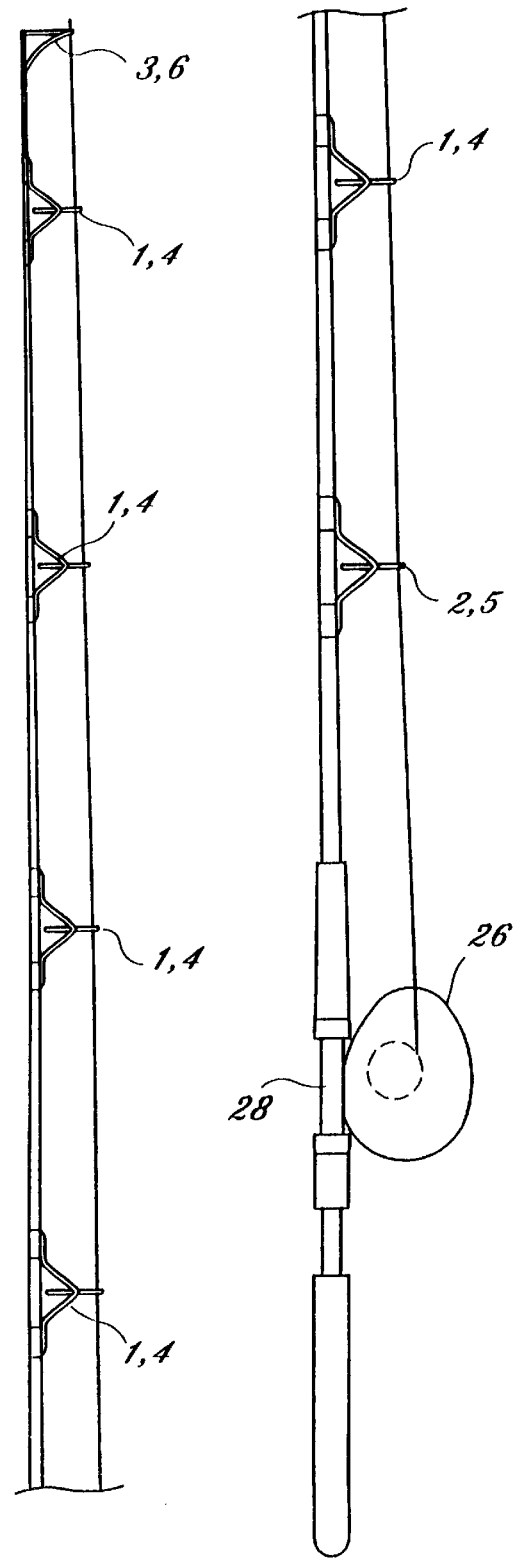
FIG. 6 is a side view of a plurality of oval fishing line guides mounted to a fishing rod in accordance with the present invention.

With reference to FIG. 6, the size of the oval fishing line guide 1 will vary depending upon its position on the fishing rod 28. The size of the first oval fishing line guide 2 is the largest and the last oval fishing line guide 3 is the smallest. The oval fishing line guides between the first 2 and the last 3 gradually decrease in size.

Figure 4A:
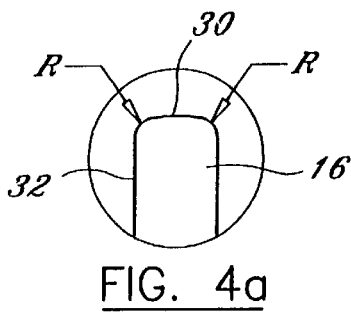
FIG. 4a is an enlarged view of an oval fishing line guide with a guide area terminated by an ellipse in accordance with the present invention.

With reference to FIG. 4a, the width "A" of the guide area varies according to one or more factors. Some of these factors include the position of the oval guide 1 on the rod, the type reel, and the type of water fished in. The closer to the reel 26, the wider the width "A" will be. A fly fishing reel will require the oval fishing line guides 1 nearest to the reel to have a wider width "A" to accommodate the horizontal travel of the fishing line on the reel. A closed face reel may be accommodated with a narrower guide area 16. The narrower the guide area 16, the less tangling effect due to uncoiling of the fishing line off the reel. The guide area 16 for salt water fishing will be wider than that for fresh water fishing.

Figure 4B:
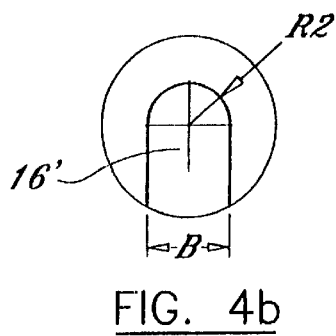
FIG. 4b is an enlarged view of an oval fishing line guide with a guide area terminated by a radius in accordance with the present invention.

With reference to FIG. 4a, the guide area 16 is preferably terminated on each end with a theoretical ellipse 30. The theoretical ellipse 30 is preferably blended into the side walls 32 of the guide area 16 with a radius "R." With reference to FIG. 4b, the guide area 16' may also be terminated on each end with a radius R2 which is equal to half the width "B". Radius R2 swung 180 degrees is a semi-circle. The guide area may also be terminated with any other shape besides those previously disclosed.

Figure 5:
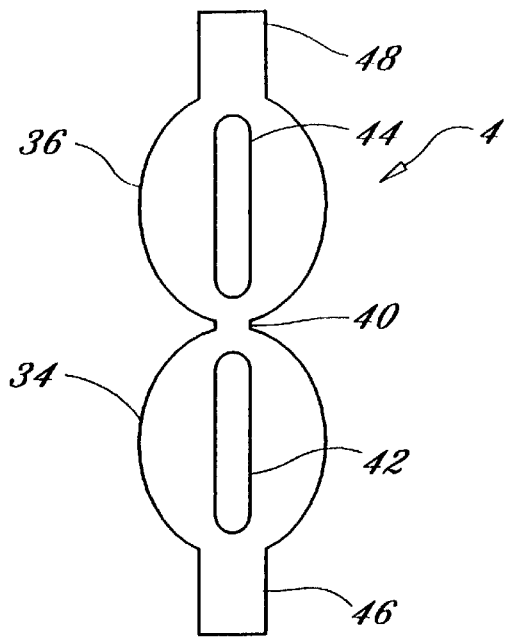
FIG. 5 is a top view of a second embodiment of an unbent oval fishing line guide in accordance with the present invention.
Figure 5A:
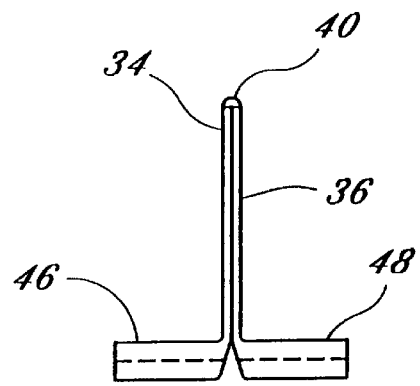
FIG. 5a is a side view of a second embodiment of an oval fishing line guide in accordance with the present invention.
Figure 5B:
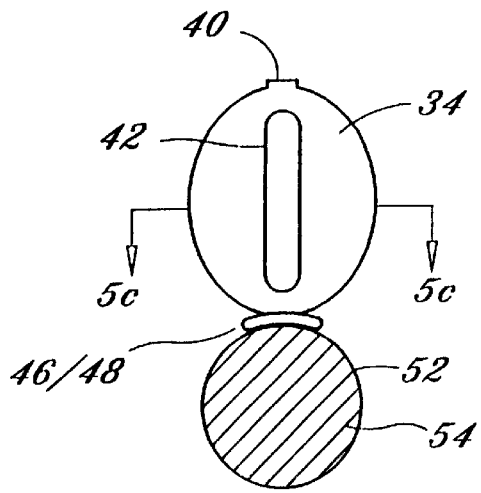
FIG. 5b is a front view of a second embodiment of an oval fishing line guide in accordance with the present invention.

FIG. 5 shows an unbent second embodiment of an oval fishing line guide 4. With reference to FIGS. 5a and 5b, the oval guide 4 is fabricated from a single metal stamping. The oval guide 4 includes a first guide 34, second guide 36, a connecting section 40, first base 46, and second base 48. A first guide area 42 is formed through the first guide 34 and a second guide area 44 is formed through the second guide 44. The first and second guide areas are the same in shape and orientation as that previously disclosed for the oval guide 1. The first and second guides are preferably retained in a substantially vertical orientation.

Figure 5C:
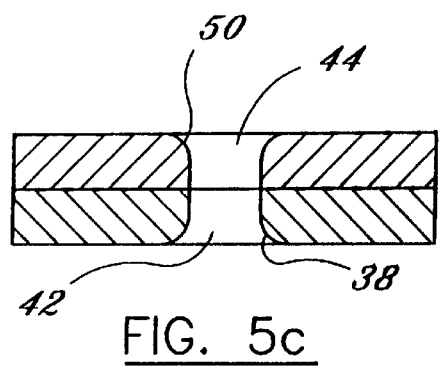
FIG. 5c is an enlarged cross-sectional view of a first and second guide areas of a second embodiment of an oval fishing line guide in accordance with the present invention.

With reference to FIG. 5c, a cross section of the first and second guide areas 16 reveal that a first entry perimeter 38 and a second entry perimeter 50 are preferably rounded to reduce friction and wear to a fishing line. The first and second entry perimeters are preferably coated with graphite to reduce the amount of friction between a fishing line and the first and second entry perimeters. A front view of the oval guide 4 shows that a bottom surface of the first and second bases are shaped to be received by an outside perimeter 52 of a fishing rod 54. The bottom surfaces of the first and second bases are shown round, but could be any other shape to accommodate the outside surface 52 of the fishing rod 54.

With reference to FIG. 6, the size of the oval fishing line guide 4 will vary depending upon its position on the fishing rod 28. The size of the first oval fishing line guide 5 is the largest and the last oval fishing line guide 6 is the smallest. The oval fishing line guides between the first 5 and the last 6 gradually decrease in size.

Figure 13:
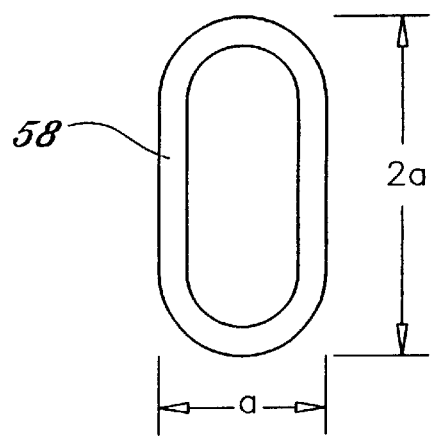
FIG. 13 is a front view of a ratio of height compared to width of an oval guide ring in accordance with the present invention.

FIGS. 7, 8 and 10 disclose a third embodiment of an oval fishing line guide 7. The oval fishing line guide 7 includes a base 56 and an oval guide ring 58. A bottom surface 61 of the base 56 is shaped to be received by an outside perimeter of a fishing rod 28. The oval guide ring 58 is attached to the base 56 in a substantially perpendicular orientation. The oval guide ring 58 may be attached to the base 56 with adhesive, brazing, or any suitable attachment method or substance. The oval guide ring 58 is preferably fabricated from a wire which has a round cross section, as shown in FIG. 10 to reduce friction and wear to a fishing line. The wire could also have another cross-sectional shape such as elliptical. The perimeter 62 of the guide area 60 preferably has straight side walls which are terminated by a radius on each end. The perimeter 62 is preferably coated with graphite to reduce the amount of friction to a fishing line. With reference to FIG. 13, the height of the oval guide ring 58 is preferably at least twice that of the width. The oval guide ring 58 and the base 56 could also be fabricated from a single piece of material by die casting, or any other suitable manufacturing process.

FIG. 9 discloses a fourth embodiment of an oval fishing line guide 8. The oval fishing line guide 8 includes a guide holder 64 and an oval guide ring 58. The guide holder 64 retains the oval guide ring 58 on the sides thereof. The oval guide ring 58 is preferably retained in a substantially vertical orientation. The guide holder 64 preferably includes a first leg 66, a second leg 68, and a first upright portion 70, and a second upright portion 72. The first and second upright portions extend upward from the first and second legs, respectively. The oval guide ring 58 may be attached to the guide holder 12 with adhesive, brazing, or any suitable attachment method or substance. The oval guide ring 58 and the guide holder 64 could also be fabricated from a single piece of material by die casting, or any other suitable manufacturing process.

Figure 14:
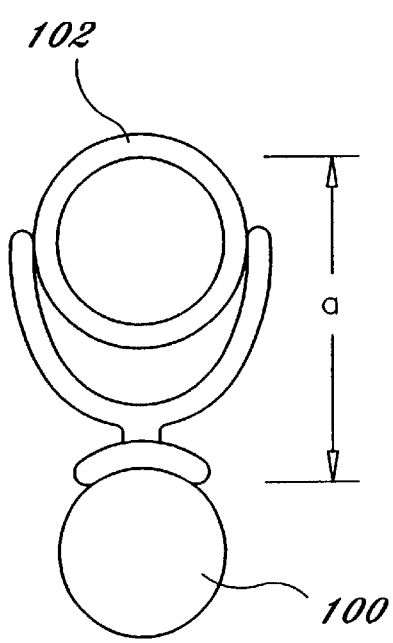
FIG. 14 is a front view of an oval fishing line guide compared to a round fishing line guide in accordance with the present invention.
Figure 14:
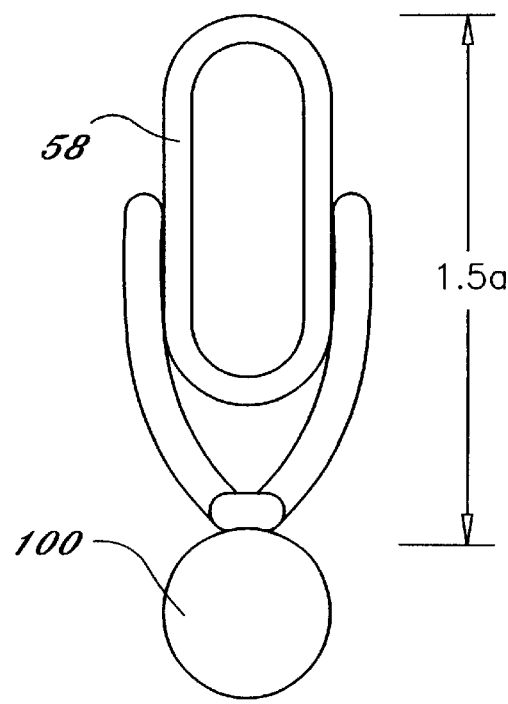

With reference to FIG. 13, the height of the oval guide ring 58 is preferably at least twice that of the width. With reference to FIG. 14, the distance from a top of the oval guide ring 58 to a top of a rod 100 is preferably at least one and one half times the height of a normal round guide 102 compared to a similarly located guide. With reference to FIG. 6, a guide is largest closest to the reel 26 and decreases in size along the rod 28. The increased height of the oval guide ring 58 increases casting distance. The narrow profile of the oval guide ring 58 also reduces line twist.

FIGS. 11 and 12 disclose a fifth embodiment of an oval fishing line guide 9. The oval fishing line guide 9 includes at least two curved legs and an oval guide ring 58. In FIG. 11, a bottom of the oval guide 58 is attached to a top of a first curved leg 74 and a top of a second curved leg 76. Ends of the first and second curved legs are preferably attached to each other. In FIG. 12, a bottom of the oval guide ring 58 is also attached to a third curved leg 78. The oval guide ring 58 is preferably retained in a substantially vertical orientation. The oval guide ring 58 may be attached to the at least two curved legs with adhesive, brazing, or any suitable attachment method or substance. The oval guide ring 58 and the at least two curved legs could also be fabricated from a single piece of material by die casting, or any other suitable manufacturing process.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A fishing rod comprising:
a plurality of oval fishing line guides being attached to said fishing rod along a length thereof, a reel being capable of being attached to said fishing rod, each one of said plurality of oval fishing line guides including a guide and a guide holder, said guide being shaped to have an oval guide area, said guide including a pair of straight substantially parallel side walls which are terminated by a radius on each end thereof, wherein said pair of side walls extend in planes that are substantially perpendicular to a longitudinal axis of the fishing rod, a bottom of said guide holder substantially contacting said fishing rod; and
said guide holder having a first leg, and a second leg, said first leg having a first upright portion, said second leg having a second upright portion, said first and second upright portions being attached to said side walls of said guide, a bottom of each of said first and second legs being attachable to said fishing rod.

2. The fishing rod of claim 1, wherein:
a perimeter of said guide area being coated with graphite.

3. The fishing rod of claim 1, further comprising:
said guide being fabricated from a wire.

4. The fishing rod of claim 1, further comprising:
said oval guide area having a height which is at least twice as long as its width.

5. A fishing rod comprising:
a plurality of oval fishing line guides being attached to said fishing rod along a length thereof, a reel being capable of being attached to said fishing rod, each one of said plurality of oval fishing line guides including a guide and a guide holder, said guide being fabricated from a wire, said guide being shaped to have an oval guide area, said guide including a pair of straight substantially parallel side walls which are terminated by a radius on each end thereof, wherein said pair of side walls extend in planes that are substantially perpendicular to a longitudinal axis of the fishing rod, a bottom of said guide holder substantially contacting said fishing rod; and
said guide holder having a first leg, and a second leg, said first leg having a first upright portion, said second leg having a second upright portion, said first and second upright portions being attached to said side walls of said guide, a bottom of each of said first and second legs being attachable to said fishing rod.

6. The fishing rod of claim 5, wherein:
a perimeter of said guide area being coated with graphite.

7. The fishing rod of claim 5, further comprising:
said wire having a round cross section.

8. The fishing rod of claim 5, further comprising:
said oval guide area having a height which is at least twice as long as its width.

\* \* \* \* \*